Oct. 3, 1933.                 D. W. HICKEY                 1,928,892
                        ELBOW HOLDER FOR WELDING
                Filed Nov. 21, 1931            3 Sheets-Sheet 1
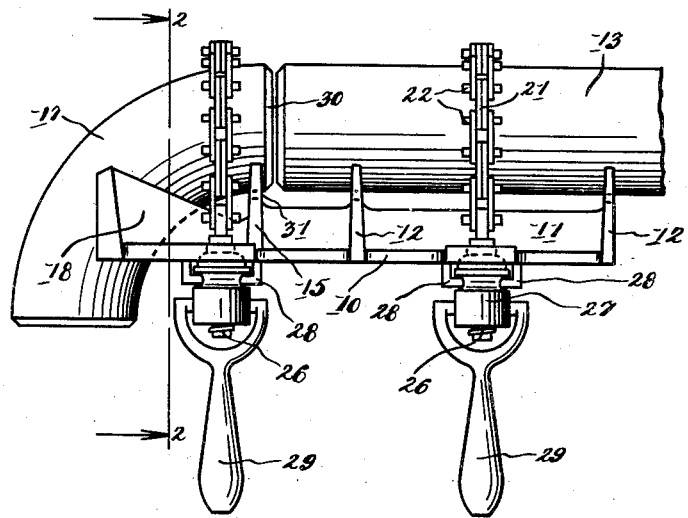
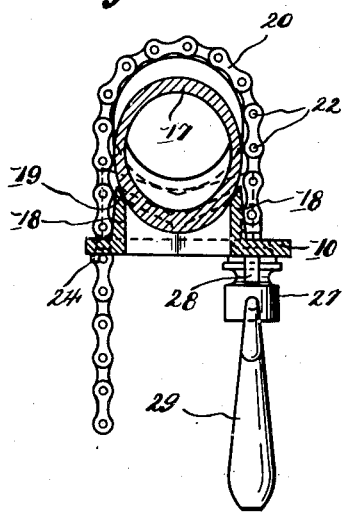
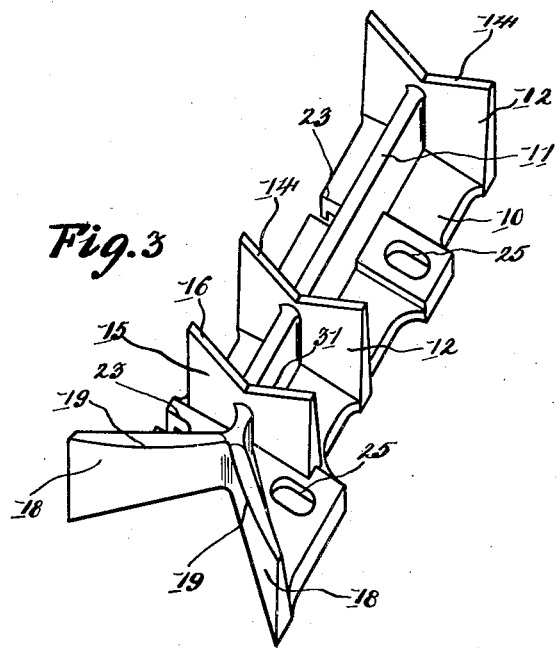
Inventor
Daniel W. Hickey
By Stryker & Stryker
          Attorneys Oct. 3, 1933.　　　D. W. HICKEY　　　1,928,892
ELBOW HOLDER FOR WELDING
Filed Nov. 21, 1931　　　3 Sheets-Sheet 2
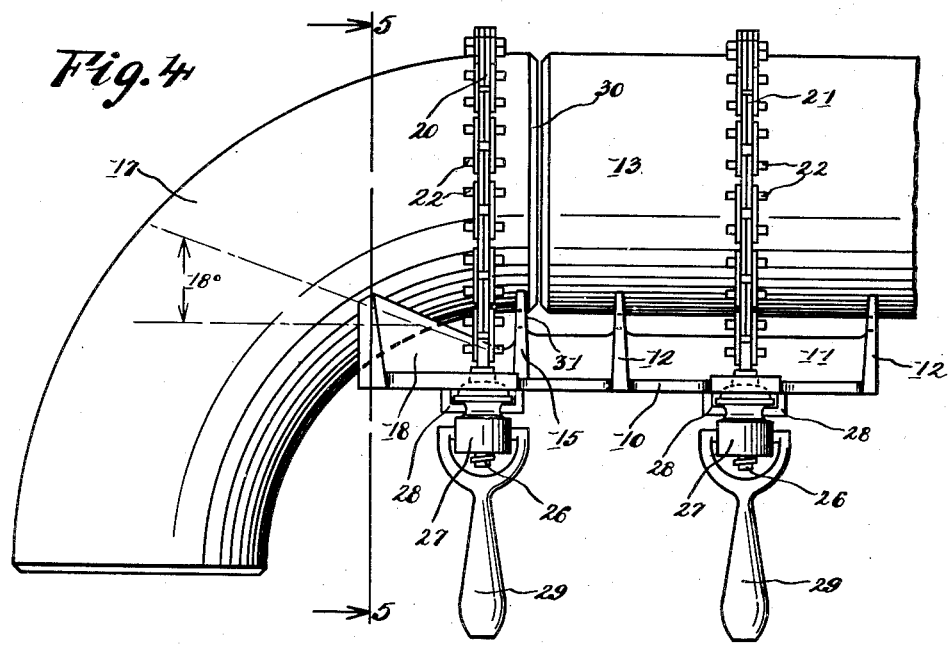
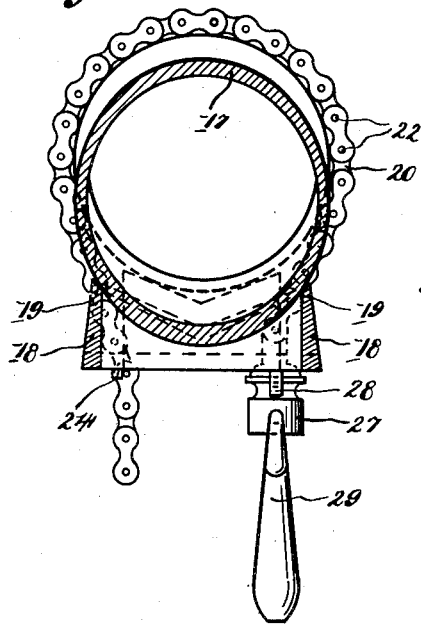
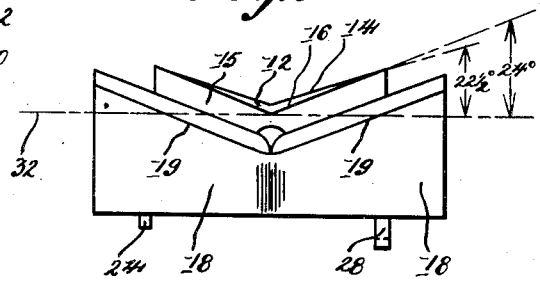
Inventor
Daniel W. Hickey
By Stryker & Stryker
Attorneys Oct. 3, 1933.   D. W. HICKEY   1,928,892
ELBOW HOLDER FOR WELDING
Filed Nov. 21, 1931   3 Sheets-Sheet 3
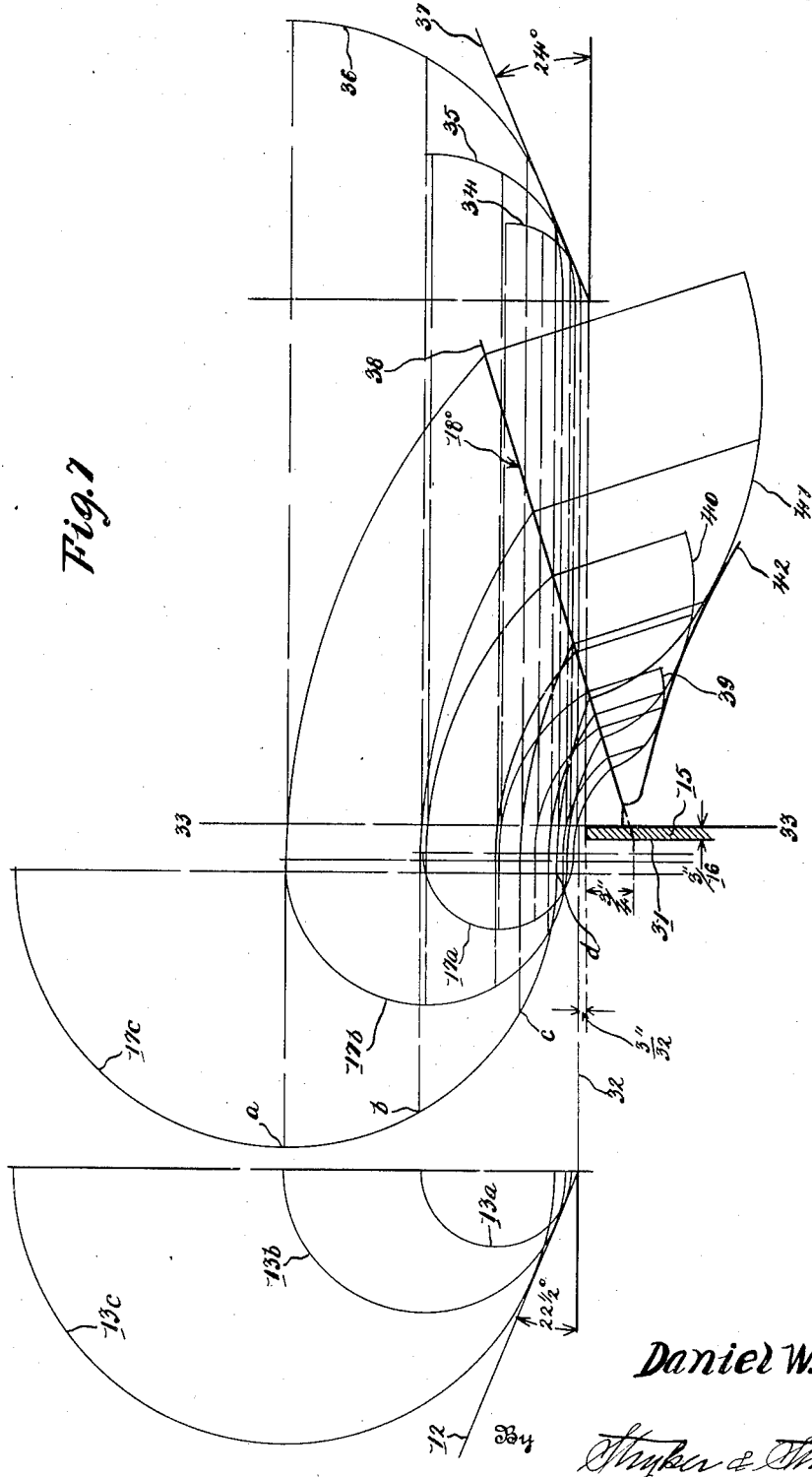
Inventor
Daniel W. Hickey
By Stryker & Stryker
Attorneys Patented Oct. 3, 1933

1,928,892

UNITED STATES PATENT OFFICE 1,928,892

ELBOW HOLDER FOR WELDING

Daniel W. Hickey, St. Paul, Minn.

Application November 21, 1931
Serial No. 576,460

12 Claims. (Cl. 219—17)

This invention relates to a device for holding pipe elbows in proper relation to other pipe sections for welding.

It is my object to provide a novel device of this kind adapted for use with pipe sections and elbows of widely different sizes.

Heretofore the operation of securing an elbow to another pipe section by welding has been relatively difficult and expensive because the operator of the welding torch is so occupied that he cannot hold the elbow or pipe and, as far as I am aware, no practical device for holding the elbows in proper position has heretofore been provided. In the absence of such a holding device two men have been employed for this work and poor workmanship and failure to secure the elbows at the proper angle and in axial alignment with the adjoining pipe section has often resulted. The recent, greatly increased use of welding in the plumbing and heating industry has created a demand for an elbow support or holder adapted to be used with pipes and fittings of different sizes. My device is simple and inexpensive and at the same time meets this need.

Referring to the accompanying drawings which illustrate the best form of my device at present known to me;

Figure 1 is a side elevation of my device with a pipe and elbow of one of the smaller sizes in place;

Fig. 2 is a section taken on the line 2—2 of Fig. 1;

Fig. 3 is a perspective view showing the main casting;

Fig. 4 is a side elevation showing the device in use with a pipe and elbow of one of the larger sizes;

Fig. 5 is a section taken on the line 5—5 of Fig. 4;

Fig. 6 is an end view of the main casting showing the saddles for the elbows; and Fig. 7 is a diagram showing the construction of the elbow saddles by methods of descriptive geometry.

The device has a long, narrow frame comprising a base plate 10 and a reinforcement consisting of a centrally located, longitudinally extending rib 11. Rising transverse the base plate 10, in parallel relation to each other, is a pair of saddles 12. These saddles are V-shaped and their upper edges 14 are adapted to engage pipes 13 at points located in planes perpendicular to the axes of said pipes. A third saddle 15 extends in substantially parallel relation to the saddles 14 and has a V-shaped upper edge 16 constituting a seat for any of the elbows 17 which differ in diameter to correspond to the pipes 13.

A pair of arms 18 project from an end of the main frame or casting. These arms 18 are symmetrically disposed relative to the central, longitudinal plane determined by the saddles 12, which plane is coincident with the axes of the pipes 13 and 17 when the latter are in proper position for welding. Each arm 18 is formed with a contact edge 19 to engage a point on the periphery of each of the elbows 17. In the embodiment illustrated, the edges 19 are positioned in a plane extending at an acute angle to the axis of the pipe 13.

Thus the arms 18 form a second, inclined or oblique saddle for the elbows and the contact edges 19 are so located that when an elbow of any of a number of different sizes is placed in engagement therewith and with the V-shaped edge 16 of the saddle 15, any such elbow will be properly located relative to a pipe of the corresponding size on the saddle 12.

Chains 20 and 21 are provided to secure elbows and pipe sections in contact with the saddles 12, 15 and edges 19 of arms 18. Each of the chains has a series of spaced pins 22 projecting therefrom and the base plate 10 is formed at one edge with notches 23 to receive said chains and permit the pins 22 to be placed in engagement with the plate 10. Small lugs 24 project downward at the sides of the notches 23 to prevent the pins 22 from slipping out of engagement with the plate 10 when the chains are placed in said notches. Opposite the notches 23, the plate 10 is formed with openings 25 to receive screw threaded studs 26 secured to the ends of the chains 20 and 21. Each of the studs 26 is fitted with a nut 27 which is held in engagement with the bottom of the plate 10 by a pair of rigid fingers 28 cast integral with said plate and engaging in a groove in the nut. The nuts 27 have handles 29 for turning them so that by suitable manipulation of the chains 20 and 21 and handles 29, elbows and pipe sections of various sizes may be secured on the saddles 12 and 15 and arms 18.

The elbows in commercial use vary somewhat in design and the present device is constructed for use with elbows known as "tube turns", the radii of curvature of which are equal to one and one-half times the nominal pipe diameters. Such elbows have beveled ends to facilitate welding and my device is designed to fit when the plane 30 of the outer bevel extremity is positioned approximately coincident with the outer face 31 of the elbow saddle 15. As the longitudinal curvature of these tube turns starts at the extreme end, or inner extremity, of the bevel, it will be evident that the saddle 15 engages the tube turn or elbow 17 at points slightly removed from the extended periphery of the corresponding pipe. This necessitates a slightly different angle for the edge 16 from that of the edges 14 of the saddles 12. In the embodiment illustrated, an angle of 22½ degrees to the plane indicated by a line 32 was selected for the saddles 12. The corresponding angle of the saddle 15 is approximately 24 degrees.

The contact edges 19 are located in a plane extending at 18 degrees to the plane 32 and intersecting the plane of the face 31 three-fourths of an inch below the center point on the edge 16. This results in a slight curvature of the contact lines 19, as more fully described with reference to Fig. 7.

The operation of the device will now be readily understood. An elbow to be secured to a pipe is merely placed in contact with the V-shaped saddle 15 and arms 18 with the plane 30 of the elbow bevel approximately coincident with the face 31 of the saddle 15, and with the contact edges 19 of the arms 18 in engagement with points on the elbow. To secure this four-point contact, the elbow must be turned so that its axis is in a plane coincident with the center plane of the several saddles. The elbow is secured in this adjusted position by applying and tightening the chain 20 and the pipe section 13 is placed on the saddles 12 with its end abutting the end of the elbow. Finally the chain 21 is applied and tightened so that the pipe and elbow are securely fastened in proper relation for welding. While thus held, the preliminary welding step or tacking of the pipe and elbow together is performed with ease by a single operator. After removal of the holder, the welding is completed in the usual or suitable manner.

The procedure, by methods of descriptive geometry, for designing the elbow saddles for a given series of elbows will be understood by reference to Fig. 7 of the drawings:

(a) The pipe saddle 12 is laid out and the various pipes 13a, 13b, 13c, etc., are shown nested in the saddle. An angle of 22½ degrees to the horizontal has been assumed for this saddle, though other angles may be employed.

(b) The longitudinal section of the elbow saddle 15 is laid out with the face 31 fixed and the various elbows 17a, 17b and 17c are placed so that the plane of the outer edge of the bevel lies in the plane of the face 31. This saddle is made three-sixteenths of an inch in thickness, arbitrarily, the plane of the face opposite the face 31 being indicated by the numeral 33.

(c) Elements, a, b, c and d are then selected on the periphery of each of the elbows. In the drawings, these have been selected at 30 degree intervals for convenience.

(d) The intersections 34, 35 and 36 of the plane 33 with the elbows 17a, 17b and 17c, respectively, are now developed using the elements a, b, c and d.

(e) The plane 37 most nearly tangent to all of the sections 34, 35 and 36 is located and the angle of this plane to the horizontal or plane 32 is the correct angle for the edge 16 of the saddle 15. The apex of this edge in the plane 33 is about three-thirty-seconds of an inch below the apex of the edge 14 of the pipe saddle 12 and the angle is approximately 24 degrees.

(f) The plane 38 for the contact edges of the arms 18 is drawn at the selected angle of 18 degrees to the horizontal and in position to intersect the plane of the face 31 at the selected distance of three-fourths of an inch below the apex of the saddle 15 and the intersection of this plane 38 with each of the elbows is developed, again using the elements a, b, c and d. In Fig. 7 these intersections are indicated by the numerals 39, 40 and 41. As there is no single tangent line which fits all of these curved intersections 39, 40 and 41, it is evident that a curved edge on the arms 18 is required to fit the several elbows. A curve 42 is, therefore, drawn tangent to the several intersections 39, 40 and 41. This curve 42 represents the correct form of the curved contact edge 19 in the plane 38 and can be used as a pattern to form the elbow saddle or arms 18 in which the several elbows will rest and properly fit.

The dimensions given in the foregoing specific description are for all of the standard elbows produced by one of the larger manufacturers in sizes having nominal diameters of from one to eight inches. It is to be understood that the actual outside diameters of the pipes are represented by the several lines 13a, 13b and 13c and that these three sizes are merely given by way of illustration. Considerations of clearness and the limited space, make it impractical to show the necessary construction lines for the entire range of pipe sizes.

By obvious modifications, the device may be adapted to fit pipes and elbows of larger diameters and of a different design.

The device is used with elbows varying from 45 to 180 degrees of curvature. By substituting arms, like the arm 18, for the straight saddles 12 the structure may be modified to hold two elbows in position for welding together.

Having described my invention, what I claim as new and desire to protect by Letters Patent is:

1. A device of the class described comprising, a pipe saddle, an elbow saddle formed to engage an elbow at points on the longitudinally curved portion thereof and spaced circumferentially on said elbow and longitudinally thereof and means for maintaining said saddles in fixed relation to each other, said elbow saddle being arranged to support elbows of any of a number of different diameters in proper predetermined relation to pipes of corresponding sizes on said first mentioned saddle.

2. A device for supporting an elbow in predetermined relation to a pipe comprising, a saddle for said pipe, a second saddle arranged to engage an elbow near its end adjacent to said pipe and a third saddle arranged to engage an elbow at points on the longitudinally curved portion thereof and spaced longitudinally of the elbow from the points of contact of said second saddle with the elbow.

3. A device for supporting an elbow in predetermined relation to a pipe comprising, a saddle for the periphery of the pipe, means for securing a pipe on said saddle, a second saddle arranged to engage an elbow at points spaced on its periphery and a third saddle arranged to engage, an elbow at points on the longitudinally curved portion thereof and spaced longitudinally of the elbow from the points of contact of said second saddle with the elbow.

4. A device for supporting an elbow in predetermined relation to a pipe comprising, a saddle for said pipe, a second saddle for engaging an elbow at points spaced on its periphery, a third saddle arranged to engage an elbow at points on the longitudinally curved portion thereof and spaced longitudinally of the elbow from the points of contact of said second saddle with the elbow and means for securing an elbow in contact with said second and third saddles.

5. A device for supporting an elbow in position for welding to a pipe comprising, a pipe saddle, an elbow saddle for engaging an end of an elbow adjacent to said pipe and a second elbow saddle comprising a pair of arms having contact edges extending in a common plane, oblique to the axis of a pipe on said pipe saddle.

6. A device for holding an elbow in position for welding to a pipe comprising, a pipe saddle, a saddle for an end of an elbow, a rigid frame connecting said saddles together in fixed, immovable relation to each other and a second saddle for engaging said elbow comprising a pair of arms projecting from an end of said frame, said arms having contact edges formed to fit any of a number of elbows of different diameters.

7. In a device of the class described, a main casting formed with a V-shaped saddle to support pipes of various sizes, a second V-shaped saddle formed on said casting in fixed and substantially parallel relation to said first mentioned saddle and a third saddle projecting obliquely from an end of said main casting in fixed and rigid relation to said first and second saddles and having contact edges formed to fit elbows of various sizes.

8. In a device of the class described, a main casting, a V-shaped saddle formed on said casting to support pipes of various sizes, a second V-shaped saddle formed on said casting to engage an elbow near an end thereof and a third saddle projecting obliquely from an end of said main casting and having contact edges adapted to fit elbows of any of a number of different sizes.

9. In a device of the class described, a pair of aligned, V-shaped saddles arranged to engage the peripheries of pipes in planes perpendicular to the axes of said pipes, a third V-shaped saddle formed on said casting to engage elbows near the ends adjacent to said pipes and a fourth saddle extending obliquely relative to said pair of saddles, said fourth saddle having edges adapted to fit elbows of sizes corresponding to the sizes of said pipes and being arranged to engage said elbows at points removed longitudinally from the points of contact of said third saddle therewith.

10. A device of the class described having in combination a frame, means for securing a pipe in fixed position on said frame, an elbow saddle formed on said frame to engage an elbow at points spaced circumferentially on said elbow and longitudinally thereof and on the longitudinally curved portions thereof, said elbow saddle being formed to support elbows of any of a number of different diameters in predetermined relation to pipes of corresponding sizes on said first mentioned means.

11. A device of the class described having in combination a frame, means for securing an elbow in fixed position on said frame, said means being formed to make contact with a plurality of points on the longitudinally curved portion of said elbow, a pipe saddle formed on said frame to engage a pipe at points spaced circumferentially on said pipe and longitudinally thereof, said pipe saddle being formed to support pipes of any of a number of different diameters in predetermined relation to elbows of corresponding sizes on said first mention means.

12. A device for supporting an elbow in predetermined relation to a pipe comprising, a saddle for the periphery of the pipe, means for securing a pipe on said saddle, a second saddle arranged to engage an elbow at points spaced on its periphery and means for engaging an elbow at points on the longitudinally curved portion and spaced longitudinally of the elbow from the points of contact of said second saddle with the elbow.

DANIEL W. HICKEY.